United States Patent

[11] 3,593,382

| | | |
|---|---|---|
| [72] | Inventor | Harold C. Miller<br>Chicago, Ill. |
| [21] | Appl. No. | 858,473 |
| [22] | Filed | Sept. 16, 1969 |
| [23] | | Division of Ser. No. 690,201, Dec. 13, 1967, Pat. No. 3,522,676 |
| [45] | Patented | July 20, 1971 |
| [73] | Assignee | Super-Cut, Inc.<br>Chicago, Ill. |

[54] APPARATUS FOR MAKING PERIPHERAL GRINDING WHEEL
5 Claims, 14 Drawing Figs.

[52] U.S. Cl. ............................................. 18/42,
18/16.5, 51/309
[51] Int. Cl. .............................................. B29c 3/00
[50] Field of Search ........................................ 18/42 R, 34 R, 16.5, 16.7, 16 R, DIG. 5; 51/309, 206

[56] References Cited
UNITED STATES PATENTS

| 1,030,364 | 6/1912 | Whitman | 18/DIG. 5 |
| 1,420,727 | 6/1922 | Moon | 18/42 X |
| 1,687,797 | 10/1928 | Sachse | 18/42 |
| 1,914,487 | 6/1933 | Carter | 18/42 |
| 3,134,143 | 5/1964 | Ludewig et al. | 18/42 |

Primary Examiner—J. Spencer Overholser
Assistant Examiner—R. L. Spicer, Jr.
Attorney—Norman H. Gerlach ABSTRACT: Apparatus for making an internally reinforced peripheral grinding wheel and by means of which radial pressure is applied outwardly to a mold mixture confined within an annular ring in the presence of heat.

PATENTED JUL 20 1971 3,593,382

INVENTOR:
HAROLD C. MILLER
By Herman Gerlach

INVENTOR:
HAROLD C. MILLER

APPARATUS FOR MAKING PERIPHERAL GRINDING WHEEL

RELATED U. S. APPLICATION

This application is a division of my copending U.S. Pat. application Ser. No. 690,201, filed on Dec. 13, 1967 now Pat. No. 3,522,676, and originally entitled "Peripheral Grinding Wheel And Method And Apparatus For Making The Same."

The present invention relates to a novel apparatus for forming an abrasive grinding wheel of the type which is commonly referred to as a peripheral grinding wheel. Such a wheel ordinarily comprises a flat circular steel body or hub, the periphery of which is surrounded by an annular grinding member in the form of sintered metal or other matrix having uniformly distributed therethrough crushed or fragmented diamonds or other hard abrasive particles such as tungsten carbide, silicon carbide or fused alumina.

Heretofore, and as exemplified in United States Pat. No. 3,369,879, granted on Feb. 20, 1968 and entitled "Method Of Making a Peripheral Diamond Grinding Wheel," it has been the practice to fabricate a peripheral grinding wheel by establishing an annular mold cavity around the periphery of a circular metallic hub, the cavity being defined by the periphery of the hub itself together with an outer encompassing mold ring and two opposed laterally movable mold rings. A mold mixture consisting of powdered metal or other fusible powder with uniformly distributed abrasive particles therein is placed in the mold cavity and the relatively movable mold rings are forced towards one another during the application of heat to the mold cavity in order to sinter or fuse the powdered metal or other material and reduce the width of the mold cavity to the desired dimension which usually is the width or thickness of the metal hub. After cooling, the three mold rings are removed and the thus formed annular grinding member remains bonded to the periphery of the hub and these two bonded together parts constitute the finished grinding wheel.

Such a method has proven quite satisfactory in connection with the formation or fabrication of narrow grinding wheels where the lateral width of the annular grinding members does not exceed 1½ inches. However, it has been found in connection with the fabrication of wider grinding wheels such, for example, as wheels having annular grinding members of a width on the order of 2 inches or more, that this method is not altogether satisfactory. Where grinding wheels having annular grinding members as wide as 4 inches are concerned, the aforementioned method is entirely without value. The reason for this is that the tremendous pressure that is required for proper sintering or fusing must be equally distributed throughout the filled mold cavity in order to avoid soft spots of low density in the finished annular grinding member. Where an axially long, but radially narrow, mold is concerned, the frictional opposition that is offered to the flow of the powdered metal or other fusible material in the mold cavity by movement of the laterally movable mold rings towards one another does not enable full molding pressure to reach the central regions of the mold cavity with the result that proper and complete sintering or fusing of the powdered matrix material takes place only near the end regions of said mold cavity. In other words, Pascal's principle of pressure transmission within a confined fluid does not apply.

The apparatus of the present invention makes possible the satisfactory fusing of a powdered matrix-producing material in situ on the periphery of a steel or other metal grinding wheel hub to a width far in excess of the aforementioned tolerable width. Commercial peripheral diamond grinding wheels having annular grinding members on the order of 4 inches already have been made according to the present invention and there is no reason to suppose that there is any limit to the width which may be accommodated by such method.

According to the present invention, instead of applying lateral or axial inward pressure to the mold mixture within the mold cavity, radial outward pressure is applied to the mixture. Thus, since the annular mold cavity is of extremely small radial thickness, relatively speaking, uniform compacting of all portions of the mold mixture in the mold cavity along its width will take place and thus the particular width of the mold cavity (and consequently of the annular grinding member to be formed) is of no consideration. The mechanical difficulties which are posed in applying radial outward pressure to the mold mixture in the annular mold cavity have been overcome by utilizing a rigid outer mold wall or ring, a pair of opposed rigid side mold walls, and a radially expansible inner mold wall, the latter constituting all, or a portion of, the wheel hub and the four walls defining a radially shrinkable or compressible mold cavity. Means are provided for effecting uniform outward radial expansion of the inner mold wall in the presence of heat, thus resulting in magnified circumferential expansion thereof, advantage being taken of the stretchability of the metal of the inner mold wall to permit such expansion. To effect such radial and circumferential expansion, a pair of opposed cam rings having frustoconical cam surfaces are forced into the side regions or confines of the inner mold wall so as to exert the necessary spreading action incident to radial expansion of said inner mold wall. The heated environment in which this spreading action takes place supplies the necessary heat for fusing the powdered component of the mold mixture, as well as for rendering the inner mold wall so sufficiently ductile that it will succumb to the radial expansion and remain in its expanded state after cooling. The provision of a novel apparatus which will apply radial pressure to a mold mixture (admixture of powdered metal or other material and abrasive particles) which is confined in the vicinity of the periphery of a grinding wheel hub, or of a portion of such a hub, constitutes the principal object of the present invention.

In the manufacture of various forms of peripheral grinding wheels, if it is desired that a finished peripheral diamond grinding wheel shall emerge from the molding operation, the aforementioned cam rings, together with the inner mold wall, are caused to constitute a composite three-part grinding wheel hub, the assembly of which produces the necessary radial expansion of the inner mold wall. If it is desired that the user of the wheel shall supply his own hub assembly, then a temporary composite hub, likewise comprised of two cam rings and an inner mold wall, is employed but the two cam rings are made removable so that after the temporary hub has been created during the molding operation, the cam rings may be removed, leaving only the inner mold wall to which the annular grinding member is firmly bonded by reason of the molding operation. In this respect, two basic modifications of the apparatus are contemplated and will be set forth in detail presently.

According to the present invention, the use of cooperating frustoconical cam surfaces of small slant angle to effect radial expansion of the inner mold wall in a heated environment produces a powerful outward radial thrust on the inner expansible mold wall far in excess of that attained by such known means for expanding a ring radially as the utilization of hydraulic expanding devices or sliding split ring arrangements in combination with toggle members.

In connection with the completed peripheral grinding wheel, whether the annular grinding member be applied to a complete hub or merely to an outer hub ring as previously described, the structure evolved from practicing the method which is carried out by the present apparatus is of a superior nature in that it is devoid of areas of low density while at the same time a firm bond between the annular grinding member and its supporting ring (i.e., the inner mold wall) is obtained coextensively along the entire annular interface.

In the accompanying three sheets of drawings forming a part of this specification, several illustrative embodiments of the present apparatus are shown.

Figure 1:
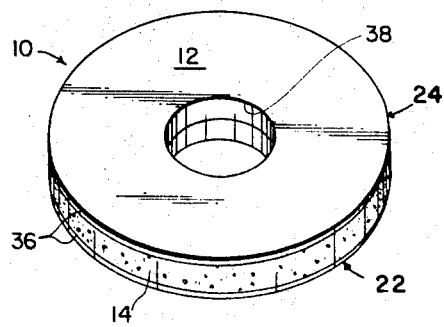
FIG. 1 is a perspective view of a peripheral diamond grinding wheel constructed according to the method which is carried out during use of the apparatus constituting the invention, the wheel having a confined annular grinding member (sintered or fused metal or other matrix with crushed or fragmented diamond particles distributed uniformly throughout)

Referring now to the drawings in detail and in particular to FIGS. 1 and 2, there is illustrated in detail a peripheral grinding wheel which is formed by the hereinafter described method, the wheel being designated in its entirety by the reference numeral 10. The wheel is of a composite nature and consists of (1) an inseparable two-part metal hub 12 which preferably is formed of steel, (2) an annular grinding member 14, and (3) a backing ring 16 for the annular grinding member, the backing ring likewise preferably being formed of steel. The structural characteristics of the grinding wheel 10 are largely a result of the method by means of which the wheel is formed, which is not to say that the structural features thereof do not, in themselves, vary widely from a conventional grinding wheel which is designed for the same purpose. However, since a full description of the method will be set forth subsequently, the present description of the grinding wheel 10 will be limited almost entirely to its structural makeup, reference to the method being made only in the interests of clarifying the grinding wheel structure and paving the way for a better understanding of the method when its description is undertaken subsequently.

Figure 2:
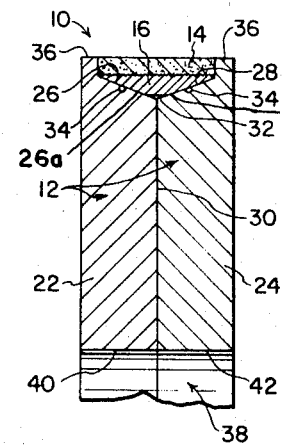
FIG. 2 is an enlarged radial sectional view taken on the line 2-2 of FIG. 1.
Figures 6A, 8:
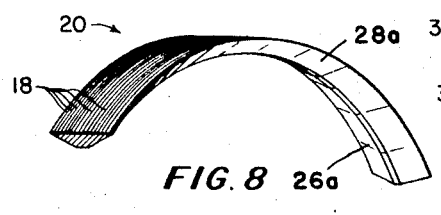
FIG. 6a is a fragmentary radial sectional view taken through an outer mold ring which is employed in forming the backing ring and annular grinding member assembly of FIG. 6.
FIG. 8 is a perspective view of a fragment of the inner mold ring which is employed in fabricating the peripheral diamond grinding wheel of FIG. 1.

Still referring to FIGS. 1 and 2, the annular grinding member 14 is in the form of a continuous, ring-shaped, matrix (fused metal or other powder) with diamond or other abrasive particles distributed substantially uniformly throughout the same. The member 14 encompasses the metal backing ring 16 and its inner periphery or side is bonded to the outer periphery or side of the backing ring by reason of either soldering or the compacting and fusing operation which is performed on the originally loose metal or other powder and abrasive particles in the presence of heat and which results in fusing of the opposed peripheral surfaces or sides of the two parts, all in a manner that will be described in greater detail when the nature of the present method is set forth. The bond between the annular grinding member 14 and the backing ring 16 is enhanced by the provision of a multiplicity of concentric, circular or circumferential striations 18 (see FIG. 8) which are provided on the outer and otherwise cylindrical side 20 of the backing ring. The backing ring 16 has substantially the radial cross-sectional shape of an isosceles triangle of small slant angle and this ring encompasses the main body portion of the composite hub 12 and seats squarely within a peripheral recess which is of V-shaped cross section and is provided in the periphery of the hub. The recess is formed by reason of the bringing together of the two sections 22 and 24 of the two-part hub 12, the sections being provided respectively with frustoconical surfaces 26 and 28 which are of small slant angle and small slant height and come together in diabolo or hourglass fashion when the inner side faces of the sections are brought together in face-to-face contact or abutment along a common meeting plane or interface 30. Except for the provision of a small centrally located annular flat 32 on the inner side of the annular grinding member 16, this inner side is shaped conformably to the V-shape contour of the aforesaid recess and embodies adjacent and oppositely extending frustoconical surfaces 26a and 28a corresponding and shaped similarly to the frustoconical surfaces 26 and 28 of the hub sections 22 and 24. Small annular grooves 34 are formed in and extend around the frustoconical surfaces 26 and 28 and are provided for reception of lengths of brazing wire or solder prior to subjecting the parts to the application of heat in performing the brazing or soldering operation. A layer or coating of brazing or soldering compound also unites and/or bonds together the two sections 22 and 24 of the two-part metal hub 12. Outwardly and radially extending retaining flanges 36 straddle the annular grinding member 14 and these flanges are integral parts of the hub sections 22 and 24 and come within the sphere of influence of the molten brazing or soldering material during the heating operation so that they are thus bonded to the sides of said annular grinding member. The hub 12 may be provided with any desired mounting facilities by means of which it may be secured to a rotatable power shaft. Accordingly, a central arbor-receiving hole 38 is provided through the hub, this hole resulting from the provision of mating central holes 40 and 42 in the two hub sections 22 and 24.

Figure 9:
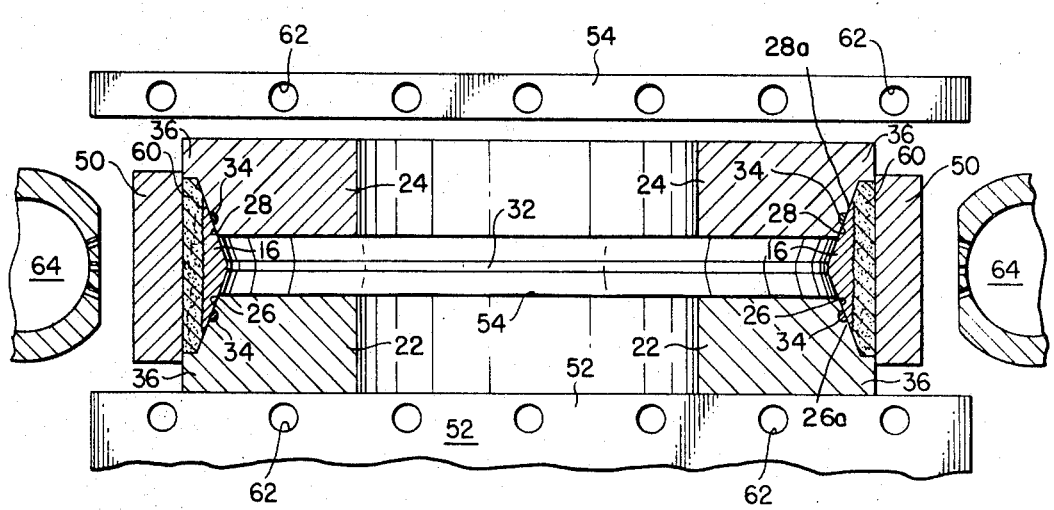
FIG. 9 is a fragmentary sectional view taken substantially centrally and vertically through the various mold parts which are employed in connection with the apparatus of the present invention, such view showing the parts in the relative positions which they assume immediately prior to the fusing and molding operation in the production of the grinding wheel of FIG. 1.
Figure 10:
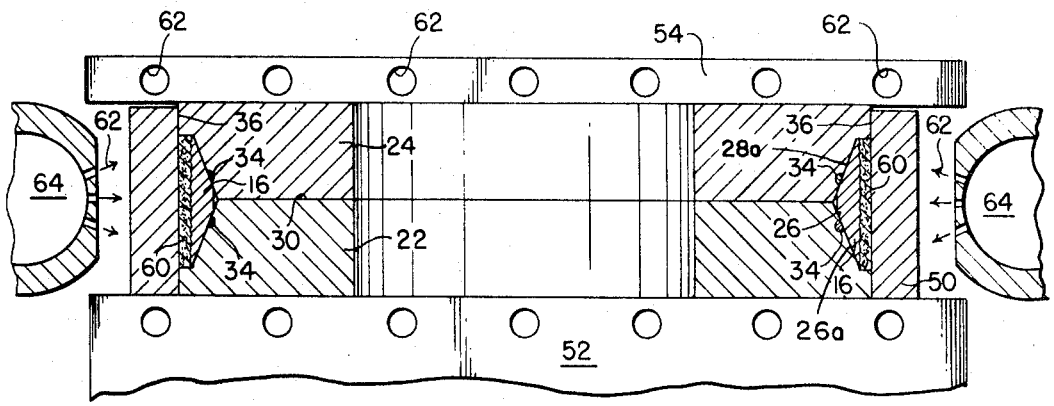
FIG. 10 is a sectional view similar to FIG. 9 but showing the mold parts in the positions which they assume during the fusing and molding operation.

Referring now to FIGS. 9 and 10, the assembly of the various grinding wheel parts described above is made by utilizing the two hub sections, as well as the backing ring 16 as relatively movable mold parts, an additional mold part in the form of an outer mold ring 50 being employed. The assembly is preferably made in a mold press including a lower press platen 52 and an upper press ram 54. The assembly is made by placing either hub section as, for example, the section 22, on the platen 52 in a horizontal position and then causing the outer portion of the inner frustoconical surface 26a of the backing ring 16 to rest on the inner portion of the frustoconical surface 26 of the hub section 22 (see FIG. 9) so that the backing ring projects upwardly above the level of the section 22 an appreciable distance. A quantity of brazing material is spread on the upper side surface 54 of the hub section 22 and a length of wire-type silver solder or the like is disposed in the annular groove 34 in the frustoconical surface 26 of the thus positioned hub section 22. The other hub section 24 is then placed or superimposed in a similar manner on the backing ring 16 and so positioned that the inner portion of the frustoconical surface 28 seats on the outer portion of the frustoconical surface 28a of the backing ring 16, a length of silver solder being first placed in the groove 34 in said frustoconical surface 28 of said other hub section 24. Thereafter, the outer mold ring 50 is telescopically received over the two hub sections 22 and 24. The minimum internal diameter of the backing ring 16 is less than the minimum diameter of either hub section and the maximum external diameter of both frustoconical surfaces 26 and 28 is greater than the maximum internal diameter of both inner frustoconical surfaces 26a and 28a of the backing ring 16. Additionally, the slant height of all four of the frustoconical surfaces is equal, with the slant angle thereof being on the order of 40° or less. The net result of such proportioning or dimensioning of the parts (hub sections 22 and 24 and backing ring 16) is such as to establish a continuous annular mold cavity 60 when the various mold parts are assembled loosely as described above and as shown in FIG. 9. This mold cavity 60 is a variable volume cavity and it is defined by the inside cylindrical surface of the outer mold ring 50, the striated outer surface of the bracking ring 16, a limited portion of each frustoconical surface 26 and 28, and the two opposed inner surfaces of the retaining flanges 36. In making or fabricating the wheel 10 by way of the mold, it is contemplated that the mold cavity will be suitably filled with the mold mixture before the parts of the mold structure or apparatus are fully assembled.

From the above description, it will be apparent that by causing the two hub section 22 and 24 to move relatively toward each other in response to downward movement of the upper press ram 54, a powerful camming action will be exerted upon the backing ring 16 tending to stretch the latter in a radial direction, thus causing the same to increase its diameter and exert a radial compressional force on the mold mixture (fusible powdered metal or other material with abrasive particles distributed uniformly throughout) which is introduced into the mold cavity 60. At the same time, the two opposing surfaces of the shoulders 36 move toward each other and offer a limited amount of transverse compressional force to the mold mixture within the cavity. The mold mixture is thus compressed in all directions, but the compression thereof is largely radial. When the two hub sections 22 and 24 are moved toward each other in the presence of heat, the molecular tenacity of the metal backing ring is reduced to such an extent that it will readily yield to the radial forces tending to stretch it. The necessary heat may be supplied to the assembled parts in the vicinity of the backing ring 16 in any suitable manner as, for example, by application to the mold ring of a series of inwardly directed flame jets 62 issuing from a gaseous fuel burner ring 64.

The final position of the various mold parts is shown in FIG. 10 wherein it will be noted that the upper hub section 24, having moved downwardly and into face-to-face contact with the lower hub section 22, has become bonded to this latter section coextensively along the interface 30 while at the same time the converging inner frustoconical surfaces 26a and 28a of the metal backing ring 16 have become bonded to the frustoconical surfaces 26 and 28 of the two hub sections, such bonding taking place by reason of the capillary flow of solder over these surfaces in the presence of flux. The camming engagement between the frustoconical surfaces 26 and 28 of the hub sections 22 and 24 and the frustoconical surfaces 26a and 28a of the backing ring 16 causes the ring to stretch outwards and thus increase its radial dimension so as to compress the mold mixture in a radial direction against the outer reaction mold ring 50, while at the same time limited transverse compression of the mixture between the retaining flanges 36 is caused to take place. Due to fusing of the powdered metal or other material in the mold cavity 60 under the influence of heat and pressure, the compacted annular grinding member 14 becomes bonded to the outer striated side 20 of the backing ring 16.

It is to be noted at this point that during descent of the upper press ram 54 sliding of the frustoconical surfaces 26 and 28 of the hub sections 22 and 24 on the inner frustoconical surfaces 26a and 28a of the backing ring 16 brings the sharp circular lateral edges of the backing ring against the annular retaining flanges 36 while the opposed meeting inner side surfaces of the two hub sections 22 and 24 come together and establish a small void in the vicinity of the annular flat 32 on the backing ring 16. This flat 32 is provided in order to accommodate any discrepancy in manufacturing tolerances which might otherwise prevent square seating of the two hub sections 22 and 24 on each other.

A series of channels 66 are formed in both the lower press platen 52 and the upper press ram 54 for circulation of a coolant fluid therethrough to prevent undue heat accumulation in these parts during formation of the grinding member.

Figure 3:
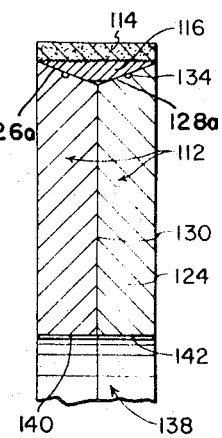
FIG. 3 is a sectional view similar to FIG. 2 but showing a modified form of grinding wheel in which the side portions thereof have been milled away to expose the sides of the annular grinding member.

In FIG. 3, a slightly modified form of grinding wheel 110 is shown, this wheel being constructed and assembled by the same method that is illustrated in FIGS. 9 and 10, and in the same mold apparatus. The only difference between the wheel 110 and the wheel 10 is that the outer side portions of the hub sections 122 and 124 have been milled away to such depth that there are no outwardly extending annular retaining flanges 36, thus exposing the side surfaces of the annular grinding member 114. In order to avoid needless repetition of description, similar reference numerals but of a higher order are applied to the corresponding parts as between the disclosures of FIGS. 3 and 2. The grinding wheel 10 with its annular retaining flanges 36 may be found useful in shaping the edges of a sheet of glass, whereas the grinding wheel 110 which is devoid of such flanges may be caused to operate upon a flat planar surface.

Figure 4:
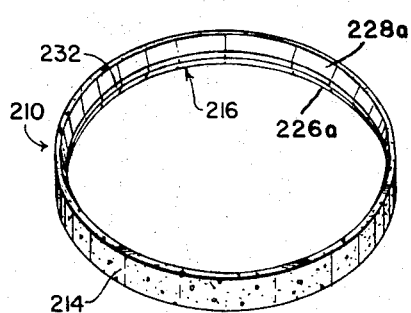
FIG. 4 is a perspective view of a backing ring and annular grinding member assembly, the assembly being designed for removable mounting on a separately fabricated hub assembly.
Figure 5:
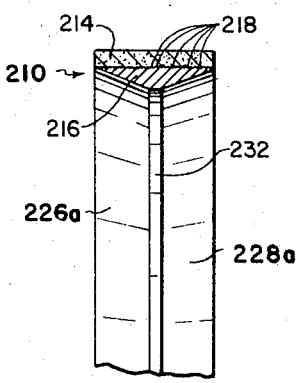
FIG. 5 is an enlarged radial sectional view taken on the line 5-5 of FIG. 4.
Figure 11:
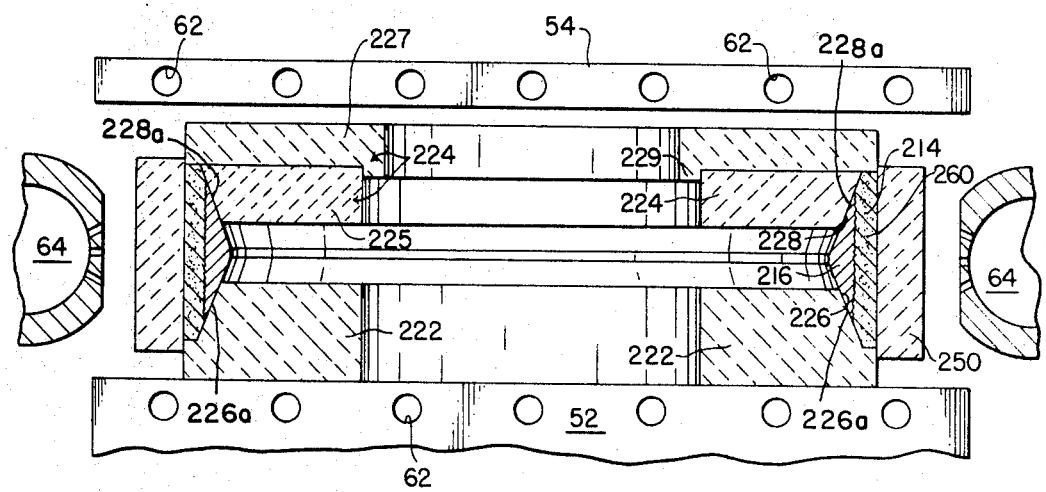
FIGS. 11 and 12 are sectional views similar to FIGS. 9 and 10, respectively, showing the production of the backing ring and annular grinding member assembly of FIG. 4.
Figure 12:
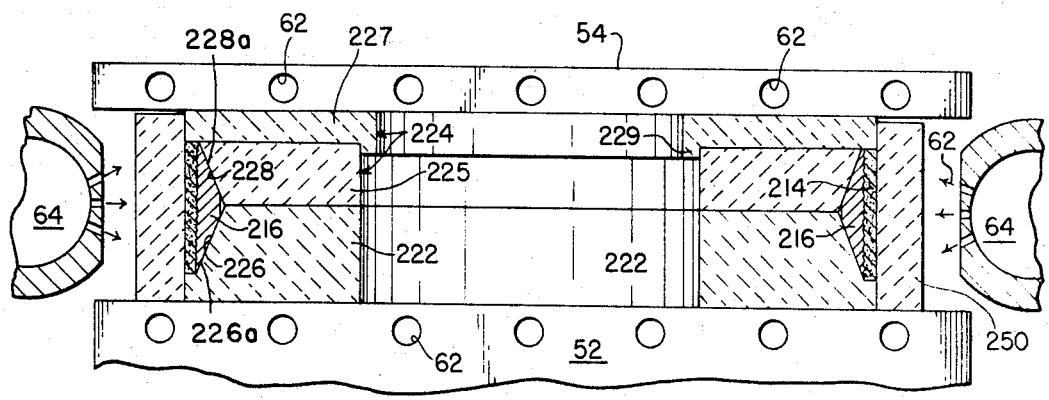

Whereas in the manufacture of either the grinding wheel 10 of FIGS. 1 and 2 or the grinding wheel 110 of FIG. 3, the two hub sections as well as the backing ring constitute movable cavity-forming mold parts which remain bonded to one another and are allowed to remain bonded so as to become actual elements of the finished wheel, it may be desirable in certain instances to supply only a reinforced or backed peripheral grinding wheel subassembly as a salable article to which the purchaser may affix his own hub structure. Such a reinforced subassembly is illustrated in FIGS. 4 and 5 and is designated in its entirety by the reference numeral 210. Again, in order to avoid repetition of description, similar reference numerals of a still higher order are employed in order to designate the corresponding parts as between the disclosures of FIGS. 5 and 3. To produce the two-piece peripheral grinding wheel subassembly 210 including only an annular grinding member 214 and its backing ring 216, the mold structure or apparatus of FIGS. 11 and 12 is employed. Utilizing corresponding reference numerals of a higher order as between the disclosures of FIGS. 11 and 12 and FIGS. 9 and 10, the mold apparatus of FIGS. 11 and 12 remains substantially the same as the mold apparatus of FIGS. 9 and 10 except for the fact that the upper mold ring 224 is formed of two parts 225 and 227, the annular solder-retaining grooves 34 are omitted, and the upper and lower mold rings, as well as the outer mold ring 250 are preferably, but not necessarily, formed of graphite. By omitting the application of solder to the interface between the upper and lower mold rings 224 and 222, removal of these rings after the sintering operation has been completed is made possible since there is no tendency for these parts to adhere to each other or to the steel backing ring 216. Removal of the outer mold ring 250 also is facilitated.

The upper mold ring 224 is made of the two parts 225 and 227 in order to facilitate filling of the mold cavity 260 with the mold mixture. A depending annular flange 229 on the inner marginal portion of the upper part 227 of the upper mold ring 224 establishes an interlock between the parts 225 and 227 for centering purposes. It will be observed that before the upper part 227 is applied during mold assembly operations, the upper rim of the annular mold cavity 260 is exposed for filling purposes. After the cavity has been filled with the proper amount of loose mold mixture, the part 227 may be placed on the part 225 to close the filling opening, after which the molding process may take place in the same manner as described in detail in connection with the mold structure or apparatus of FIGS. 9 and 10.

Figure 6:
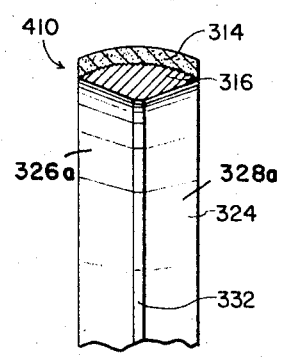
FIG. 6 is a sectional view similar to FIG. 5 but showing a slightly modified form of backing ring and annular grinding member assembly.

In FIG. 6, a further modified form of reinforced peripheral grinding wheel subassembly is disclosed and it is designated in its entirety by the reference numeral 310. The annular grinding member 312 is of concavo-convex radial cross section with its convex side facing outwardly, and the backing ring 316 is formed with an outer convex striated outer side 320 to accommodate the convex inner surface of the annular grinding member. Similarly, in the molding process or method which is conducted in accordance with the principles set forth in connection with FIGS. 11 and 12, the outer mold ring 350 (see FIG. 6a) is formed with a concave inner surface 351 in order to accommodate the convex outer surface of the annular grinding member. The actual molding and milling procedures which are employed in connection with the manufacture of the reinforced peripheral wheel subassembly 310 of FIG. 6 do not deviate from those that are employed in the manufacture of the reinforced grinding wheel subassembly 210.

Figure 7:
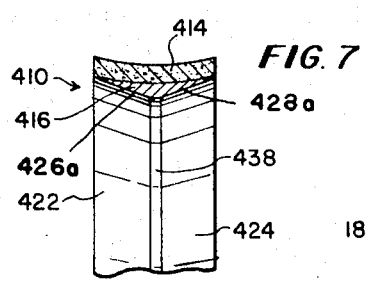
FIG. 7 is a sectional view similar to FIGS. 5 and 6 but showing a further modified form of backing ring and annular grinding member assembly.
Figure 7A:
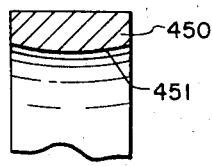
FIG. 7a is a fragmentary radial sectional view taken through an outer mold ring which is employed in forming the backing ring and annular grinding member assembly of FIG. 7.

In FIG. 7 yet another form of reinforced peripheral grinding wheel subassembly is shown and it is designated by the reference numeral 410. The annular grinding member 414 is of concavo-convex radial cross section with its concave side facing outwardly. The outer mold ring 450 (see FIG. 7a which is employed in connection with the molding apparatus for forming the subassembly 410 has an inner convex surface 451 and it is conformable to the outer exposed concave surface of the annular grinding member 414.

The invention is not to be limited to the exact arrangement of parts shown in the accompanying drawings or described in this specification as various changes in the details of construction may be restored to without departing from the spirit or scope of the invention. For example, the reinforced peripheral grinding wheel subassembly of FIGS. 4 to 7, inclusive, may readily have permanent hub structures applied thereto by forming the same in the mold cavity of FIGS. 9 and 10 instead of the molding apparatus of FIGS. 10 and 11, it being understood, of course, that the shapes of the involved mold parts will be fashioned to accommodate the configuration of the particular annular grinding members which are to be formed. Still further, whereas the method described herein has been set forth on the basis of utilizing a mixture of metal powder and abrasive particles in the mold cavity, such description is predicated upon the use of specific materials which have been found practical in actual practice. It is within the purview of the invention, however, to utilize various vitreous or other nonmetallic fusible powdered materials which, strictly speaking, are fused rather than sintered.

Having thus described the invention what I claim as new and desire to secure by letters patent is:

1. Molding apparatus for producing an annular grinding member consisting of a sintered metal matrix with abrasive particles disposed therein, said apparatus comprising a horizontally disposed outer fixed annular mold wall, an inner heat-deformable metal mold wall disposed in concentric relationship with respect to the outer mold wall and, in combination with the outer mold wall, defining a narrow annular mold cavity therebetween for reception of a mixture of fusible powder and abrasive particles, a lower cam ring disposed within said outer mold wall and provided with an upwardly and outwardly facing frustoconical cam surface on which said inner mold wall is supported, an upper cam ring disposed within said outer mold wall and provided with a downwardly and outwardly facing frustoconical cam surface bearing against the inner mold wall and by means of which the upper cam ring normally is supported on the latter, means for applying heat to said molding apparatus in the vicinity of the mold cavity and inner mold wall to render the inner mold wall ductile and to apply heat to the mixture within the mold cavity, and means for moving said cam rings toward each other to effect camming engagement between the cam surfaces thereof and the heated inner mold wall in order to stretch the latter and cause radial and circumferential expansion thereof and consequent compression of the mixture in a radial direction within the mold cavity during the application of heat thereto for powder fusing purposes.

2. Molding apparatus as set forth in claim 1 and including, additionally, cooperating frustoconical cam surfaces on said inner mold wall against which the frustoconical cam surfaces on the two mold rings bear respectively and with which they make sliding engagement when the cam rings are moved toward each other.

3. Molding apparatus as set forth in claim 2 and including, additionally, radial flanges on said upper and lower cam rings closing the upper and lower ends of said mold cavity and effective to apply transverse compression to the mixture within the cavity when the cam rings are moved toward each other.

4. Molding apparatus as set forth in claim 3 and wherein said cam rings are formed of graphite to prevent bonding thereof to said inner mold wall under the influence of heat and pressure.

5. Molding apparatus as set forth in claim 3 and wherein said cam rings are formed of metal whereby, under the influence of heat, pressure, and the application of a bonding agent thereto they may be bonded to said inner mold wall and, in combination with said inner mold wall, constitute a composite hub for said grinding member.